(12) United States Patent
Sekiguchi

(10) Patent No.: US 6,196,642 B1
(45) Date of Patent: Mar. 6, 2001

(54) FOUR-PISTON BRAKE FLUID PRESSURE CONTROLLER WITH DIAPHRAGM

(75) Inventor: Akihiko Sekiguchi, Saitama (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 0 days.

(21) Appl. No.: 09/055,350

(22) Filed: Apr. 6, 1998

(30) Foreign Application Priority Data

May 2, 1997 (JP) ................................................ 9-114607
May 2, 1997 (JP) ................................................ 9-114612

(51) Int. Cl.[7] ...................................................... B60T 13/12
(52) U.S. Cl. ........................................ 303/115.4; 303/116.1
(58) Field of Search ......................... 303/115.4, 116.1, 303/116.2, 113.1, 117.1, 115.5

(56) References Cited

U.S. PATENT DOCUMENTS

| 4,660,899 | * | 4/1987 | Ando et al. | ........................... 303/115.4 |
| 4,872,731 | * | 10/1989 | Nakamura | ........................... 303/115.4 |
| 5,123,717 | * | 6/1992 | Willmann | ........................... 303/115.4 |
| 5,171,073 | * | 12/1992 | Matsuda et al. | ........................... 303/116.1 |
| 5,330,254 | * | 7/1994 | Ravndal et al. | ........................... 303/115.4 |

FOREIGN PATENT DOCUMENTS

| 4126120 | * | 2/1993 | (DE) | ................................. 303/115.4 |
| 61-53265 | | 11/1986 | (JP) . | |

* cited by examiner

Primary Examiner—Matthew C. Graham
(74) Attorney, Agent, or Firm—Morgan, Lewis & Bockius LLP (57) ABSTRACT

A brake fluid pressure controller of a brake having a master cylinder and wheel cylinders includes a control valve having a pilot piston, wherein pressure generated in the master cylinder acts on the pilot piston to control pressure generated in a pressure source, and wherein the generated pressure is applied to the wheel cylinders, and changeover valves for applying the pressure on the pilot piston.

11 Claims, 6 Drawing Sheets

FOUR-PISTON BRAKE FLUID PRESSURE CONTROLLER WITH DIAPHRAGM

This application claims the benefit of Japanese Patent Application Nos. Hei. 9-114607 and Hei. 9-114612, both filed on May 2, 1997, which are hereby incorporated by reference.

BACKGROUND OF THE INVENTION

1. Field of the Invention

The present invention relates to a brake fluid pressure controller having an automatic braking function such as anti-lock control, traction control and yawing moment control, and more particularly, to a structure for sealing a piston in a control valve used in an anti-lock automobile brake.

2. Discussion of the Related Art

A well-known conventional brake fluid pressure controller has a brake fluid passage changed over by pressure generated in a master cylinder, and in which the hydraulic pressure from a hydraulic pressure source is transmitted to a hydraulic pressure transmitter in order to boost the hydraulic pressure. Such a conventional brake fluid pressure controller is disclosed in Japanese Examined Patent Publication No. 61-53265.

Figure 7:
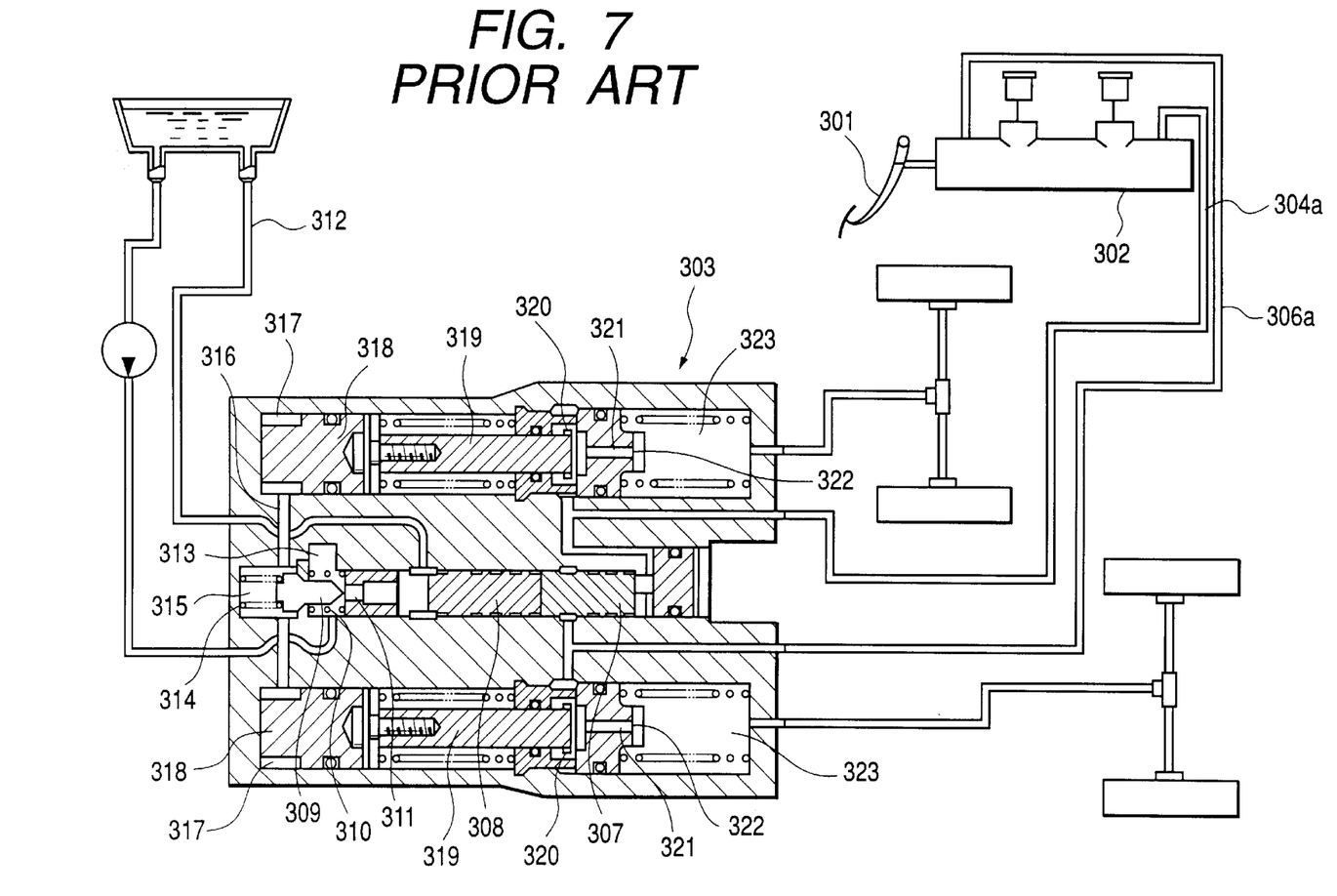
FIG. 7 shows a conventional brake fluid pressure controller.

FIG. 7 shows a conventional hydraulic brake system of the Japanese Examined Patent Publication No. 61-53265. When a driver presses a brake pedal 301, hydraulic pressure is generated in a master cylinder 302. The hydraulic pressure is transmitted to a modulator cylinder 303 via branch pipes 304a, 306a. Therefore, the hydraulic pressure acts on base portions of pistons 307, 308, so that the pistons 307, 308 can be displaced to the left in FIG. 7, and a hole 311 of the piston 308 is closed by a conic end portion 310 of a shut-off valve 309. At the same time, a passage 312 is closed, and servo hydraulic pressure is generated in a hydraulic chamber 313.

The servo hydraulic pressure generated in the hydraulic chamber 313 displaces the shut-off valve 309 and resists a force generated by a return spring 314. As a result, pressurized hydraulic fluid flows into a distributing chamber 315. The pressurized hydraulic fluid then flows from the distributing chamber 315 into hydraulic chambers 317 of both servo cylinders through a passage 316. Hydraulic pressure generated in the hydraulic chambers 317 displaces a servo piston 318. Due to the displacement of the servo piston 318, a stem 319 is displaced to the right in FIG. 7. As a result, end flanges 320 of each stem 319 engages each auxiliary piston 321. Therefore, a hole 322 of each auxiliary piston 321 is closed.

The hydraulic fluid in each hydraulic chamber 323 is pressurized by a thrust given by each servo piston 318. Therefore, the hydraulic pressure in each hydraulic chamber 323 transmitted from the master cylinder 302 is proportionally increased. Accordingly, each auxiliary piston 321 is given a force of servo, and the brake can be operated. As a result, the force a driver needs to apply to the brake pedal 301 can be reduced.

However, the following problems may be encountered in the conventional brake fluid pressure controller. The conventional brake fluid pressure controller does not have an automatic braking function. Further, since the same bulkhead seal is shared by the pistons 307 and 308, it is difficult to effect an automatic braking operation in which the pistons 307 and 308 are effectively utilized. Further, adding an automatic braking function to the conventional brake fluid pressure controller makes the entire brake structure complicated.

Moreover, a piston arranged in a modulator of a brake booster, such as described above, includes hydraulic chambers formed on both sides of the piston that are sealed by a sealing member, such as an O-ring, attached to an outer circumference of the piston. Therefore, when the piston moves in the cylinder, a sliding resistance is generated between the sealing member and an inner circumferential surface of the cylinder. When a contact pressure between the sealing member and the inner circumferential surface of the cylinder is increased to improve the sealing effect, the sliding resistance is also increased when the piston moves in the cylinder. To overcome the sliding resistance, a high hydraulic pressure is needed in order to operate the piston. When the hydraulic pressure is increased, a loss occurs in the hydraulic pressure over time, and the response of the brake deteriorates. Further, when wheel cylinder pressure is generated, the driver must press the brake pedal 301 harder. Hysteresis occurs due to the sliding resistance of the sealing member when a pressurized state is shifted to a depressurized state. As a result, control characteristics of the brake deteriorate.

SUMMARY OF THE INVENTION

Accordingly, the present invention is directed to a brake fluid pressure controller that substantially obviates one or more of the problems and limitations of the related art.

One object of the present invention is to provide a diaphragm arranged on an end surface of a piston, wherein both hydraulic chambers provided on the right and left of the piston are sealed from each other by the diaphragm.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a brake fluid pressure controller of a brake having a master cylinder and wheel cylinders including a control valve having a pilot piston, wherein pressure generated in the master cylinder acts on the pilot piston to control pressure generated in a pressure source, and wherein the generated pressure is applied to the wheel cylinders, and changeover valves for applying the pressure on the pilot piston.

In another aspect of the present invention, there is provided a brake fluid pressure controller including a diaphragm slidably arranged on a front end surface of a piston in a cylinder, wherein a circumference of the diaphragm is secured to the cylinder via a flexible portion of the diaphragm, wherein a hydraulic chamber formed in the cylinder and sectioned by an end surface of the piston is sealed by the diaphragm.

In another aspect of the present invention, there is provided a brake fluid pressure controller of a brake having a tandem master cylinder and a wheel cylinder including a control valve connected to a hydraulic pressure source for feeding hydraulic pressure of the hydraulic pressure source to the wheel cylinder while the hydraulic pressure is being controlled by moving a spool piston in response to hydraulic pressure generated in the tandem master cylinder, the spool piston being positioned in the control valve, and a diaphragm on an end surface of the spool piston for changing over a passage, wherein the spool piston is slidably arranged in a cylinder of the control valve, wherein an outer circumference of the diaphragm is secured in a main body of the control valve via a flexible portion of the diaphragm.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

In the present invention, unlike the conventional brake fluid pressure controller wherein a sealing member is arranged between an inner circumferential wall of a cylinder and an outer circumference of a piston, a diaphragm is attached to an end surface of the piston, and both hydraulic chambers arranged on the right and left of the piston are sealed by the diaphragm. Therefore, no hydraulic pressure loss is caused in the operating hydraulic pressure of the piston of the present invention. When a wall thickness of the diaphragm is changed, its effective diameter can be changed during operation, so that an amplification ratio can be changed and brake response can be improved.

Figure 1:
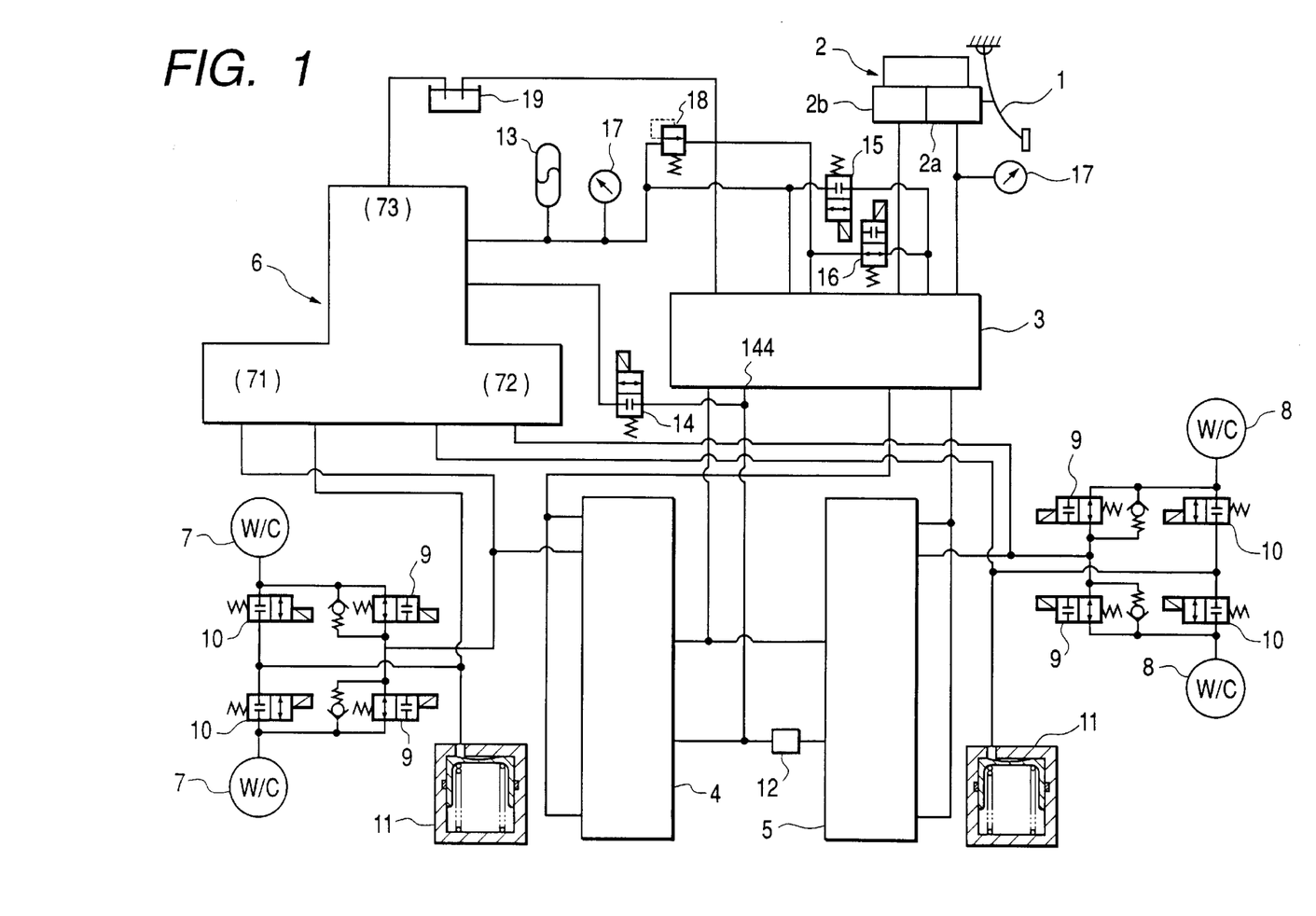
FIG. 1 shows a schematic of a brake fluid pressure controller of a preferred embodiment of the present invention.

As shown in FIG. 1, when a brake pedal 1 is operated and hydraulic pressure (brake fluid pressure) is generated in a tandem master cylinder 2, a control valve 3 is operated by the hydraulic pressure. The hydraulic pressure in the control valve 3, which is proportionally increased with respect to the hydraulic pressure of the master tandem cylinder 2, is transmitted from a third output port 144 of the control valve 3 to hydraulic pressure transmitters 4, 5. Hydraulic pressure generated in the hydraulic pressure transmitters 4, 5 is fed to wheel cylinders 7, 8, respectively, so that the brakes can be operated.

When there is a possibility that wheels are locked during braking, anti-lock control is carried out as follows. After a signal sent from a wheel speed sensor (not shown), an output signal is sent out from an electronic unit (not shown). The output signal opens and closes holding valves 9 and decay valves 10, so that the hydraulic fluid in the wheel cylinders 7, 8 is discharged into an anti-lock reservoir 11 used for anti-lock operation. At the same time, a pump 6 is operated, so that the hydraulic fluid can be pumped out of the anti-lock reservoir 11. Thus, the hydraulic fluid in the wheel cylinders 7, 8 can be controlled during the anti-lock operation. When the pump 6 is operated, a booster pump 73 (explained in detail below with reference to FIG. 4) incorporated into the pump 6 is also operated. The booster pump 73 pumps out the hydraulic fluid from the hydraulic pressure transmitters 4, 5, so that the hydraulic fluid accumulates in an accumulator 13.

In the brake fluid pressure controller of the present invention, in a period of kickback caused on a tandem master cylinder side during the anti-lock operation, the hydraulic pressure in the wheel cylinders 7, 8 is reduced while the hydraulic pressure in the accumulator 13 is being dissipated. On the other hand, while the booster pump 73 is pumping the hydraulic fluid out of the hydraulic pressure transmitters 4, 5, the hydraulic pressure can be accumulated in the accumulator 13. A pressure gauge 17 measures the pressure being accumulated in the accumulator 13. Thus, a load on the pump 6 can be reduced, and the hydraulic fluid is pumped out again by a pump from the reservoir at atmospheric pressure and accumulated in an accumulator.

When the wheels of an automobile that is stationary slip on a road, when the brakes automatically operate because a sensor detects that the automobile is about to collide with an object in front of it, or when automatic brake control, such as yawing moment control, is carried out, it is possible to operate a piston in the control valve 3 by the hydraulic pressure transmitted from the accumulator 13, so that an appropriate braking force can be applied to each wheel.

Principal components of the brake fluid pressure controller of the present invention will now be explained in detail.

Figure 2:
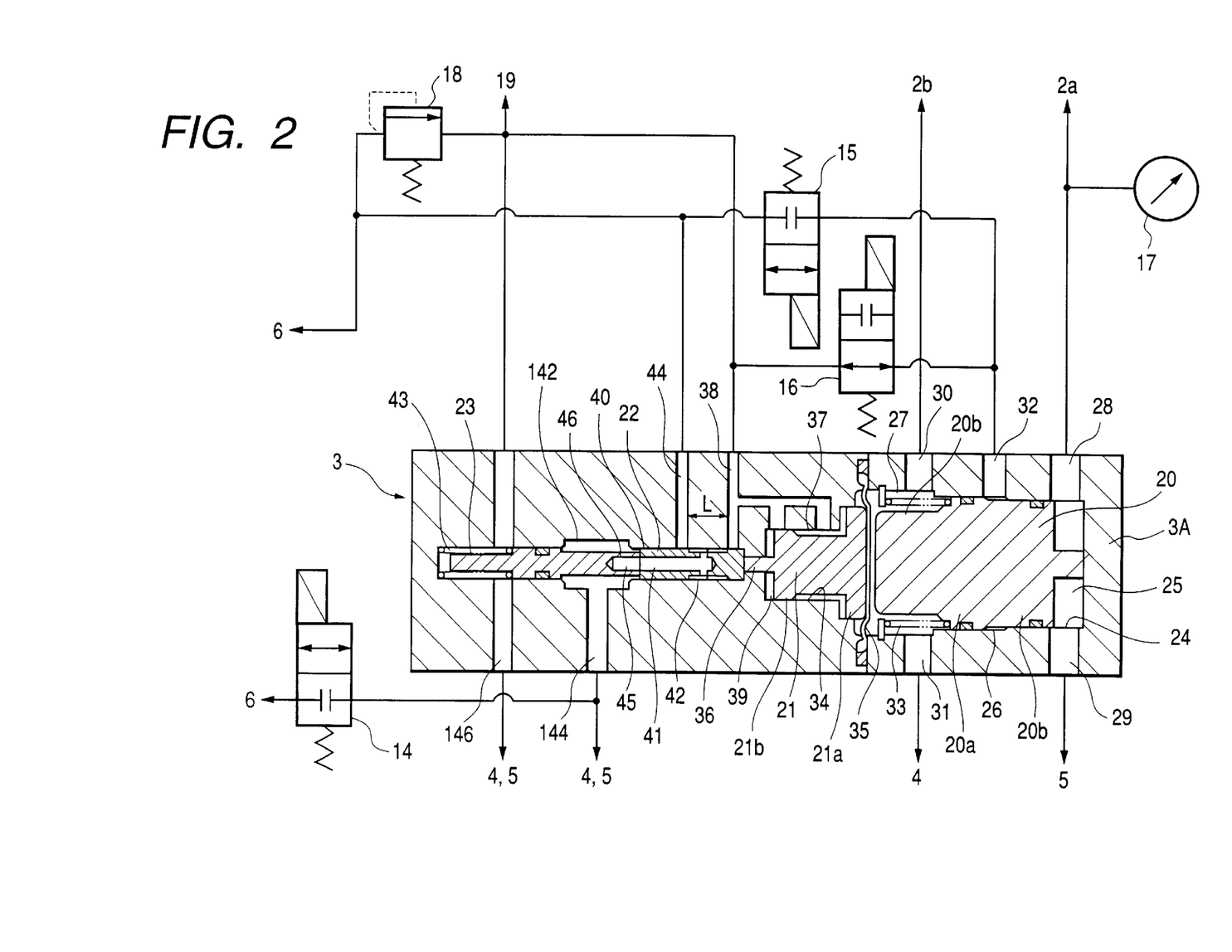
FIG. 2 is an enlarged cross-sectional view of a control valve of the present invention.

As shown in FIG. 2, a pilot piston 20, a diaphragm piston 21, a spool piston 22 and a discharge absorbing piston 23 are located in a control valve main body 3A of the control valve 3. The pistons 20, 21, and 22 and 23 are slidably arranged in a first cylinder 24, a second cylinder 34 and a third cylinder 40, respectively, as shown in FIG. 2. Diameters of the cylinders 24, 34, and 40 are determined in the order of: diameter of the first cylinder 24>diameter of the second cylinder 34>diameter of the third cylinder 40.

The pilot piston 20 is slidably arranged in the first cylinder 24 and formed into a stepped shape including a large diameter portion 20a and a small diameter portion 20b. A first hydraulic chamber 25, a second hydraulic chamber 26 and a third hydraulic chamber 27 are sectioned in the first cylinder 24 by the pilot piston 20. The first hydraulic chamber 25 communicates with a first hydraulic pressure chamber 2a of the tandem master cylinder 2 via a first input port 28. Also, the first hydraulic chamber 25 communicates with the hydraulic pressure transmitter 5 on a rear wheel side via a first output port 29. The second hydraulic chamber 26 communicates with a third changeover valve 16 and a second changeover valve 15 via a third input port 32. The third hydraulic chamber 27 communicates with a second hydraulic pressure chamber 2b of the tandem master cylinder 2 via a second input port 30. Also, the third hydraulic chamber 27 communicates with the hydraulic pressure transmitter 4 via a second output port 31.

The pilot piston 20 is normally biased to the right in FIG. 2 by a spring 33 in the third hydraulic chamber 27.

The diaphragm piston 21, opposed to the pilot piston 20, is slidably arranged in the second cylinder 34. The diaphragm piston 21 has a stepped shape including a large diameter portion 21a and a small diameter portion 21b. On an end surface of the large diameter portion 21a, a diaphragm 35 seals off the diaphragm piston 21 from the third hydraulic chamber 27.

Figure 5:
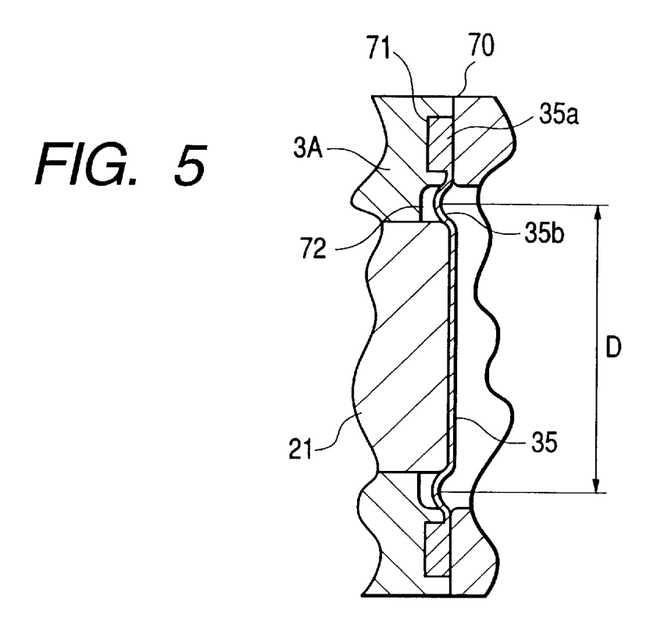
FIG. 5 is an enlarged cross-sectional view of a diaphragm piston of FIG. 2.

As shown in FIG. 5, a center of the diaphragm 35 is in contact with an end surface of the diaphragm piston 21. When necessary, the center of the diaphragm 35 adheres to the end surface of the diaphragm piston 21 by a fixing means, such as, for example, an adhesion material. An outer circumference of the diaphragm 35 is fixed in such a manner that a holding portion 35a formed in a periphery of the diaphragm 35 is sealed against and fixed to an engaging portion 71 formed in a dividing and joining portion 70 of the control valve main body 3A. A flexible portion 35b is located between the holding portion 35a and a stationary portion of the diaphragm piston 21. A recess portion 72 is formed between an outer circumference of the diaphragm piston 21 and the engaging portion 71 on the control valve main body side, allowing for movement of the flexible portion 35b.

The diaphragm piston 21 moves when the hydraulic pressure is applied to a portion of the diaphragm piston 21 corresponding to an effective diameter D shown in FIG. 5. The diaphragm 35 also functions as a sealing member. Therefore, it is unnecessary to have a separate sealing member on the outer circumference of the diaphragm piston 21, and no sliding resistance is generated by the sealing member. When the diaphragm piston 21 moves forward and back, resistances are the same. Therefore, no hysteresis is generated.

Figure 6A:
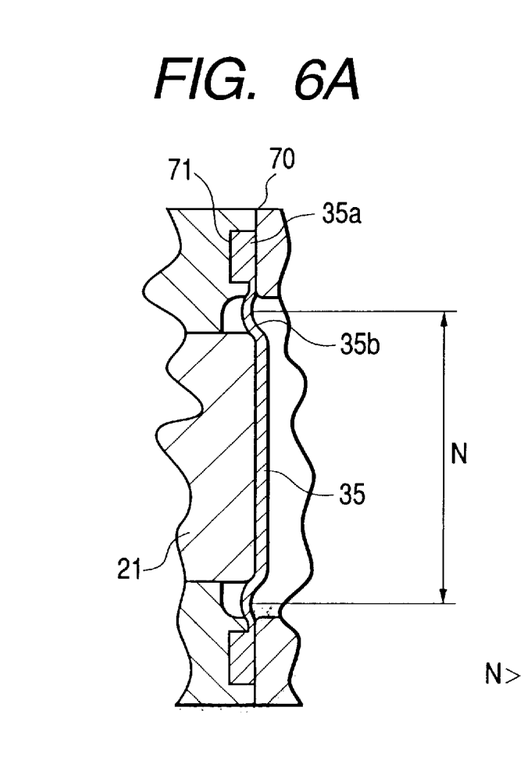
FIGS. 6(A)–6(B) show alternative shapes of the diaphragm piston of FIG. 5.
Figure 6B:
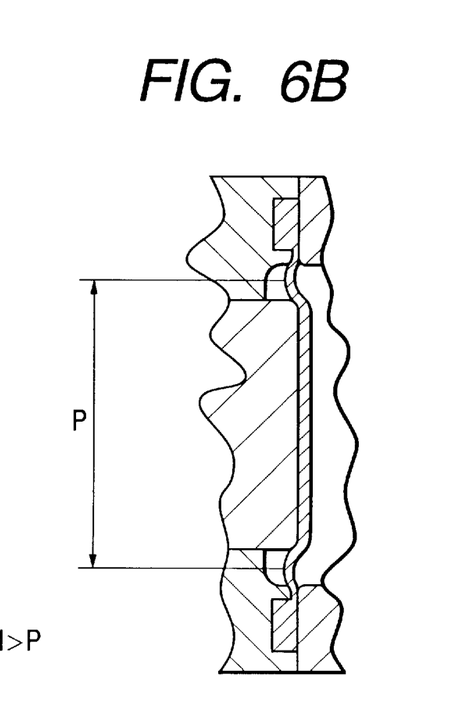

When wall thickness of the flexible portion 35b is gradually reduced from a center of the diaphragm 35 to its outer circumference, it is possible to change an amplification ratio during the operation of the diaphragm piston 21. When the wall thickness of the flexible portion 35b is gradually reduced from the center of the diaphragm 35 to its outer circumference, as shown in FIGS. 6(A) and 6(B), an effective diameter N for a very low hydraulic pressure is different from an effective diameter P for other hydraulic pressures. That is, as the hydraulic pressure increases, the effective diameter is decreased in such a manner that N>P. Therefore, it is possible to change the amplification ratio between a very low pressure and other pressures. Accordingly, the response characteristics during an initial stage of the braking operation can be improved.

The wall thickness of a thick portion of the flexible portion 35b of the diaphragm 35 can be selected as desired by the brake designer.

As shown in FIG. 2, on an end surface of the small diameter portion 21b of the diaphragm piston 21, there is provided an engaging protrusion 36 that comes into contact with the spool piston 22. A groove 37 is formed in the periphery of the small diameter portion 21b. A hydraulic chamber 39 on a small diameter end surface side of the diaphragm piston 21, which is sectioned by the groove 37 and the diaphragm piston 21, communicates with the reservoir 19 via a second cylinder passage 38 formed in the control valve main body 3A.

The spool piston 22 comes into contact with the engaging protrusion 36. The spool piston 22 is slidably arranged in the third cylinder 40. A central passage 41 is formed at the center of the spool piston 22. The central passage 41 communicates with a groove 42 formed on an outer circumference of the spool piston 22. During non-operation, the groove 42 communicates with the reservoir 19 via the second cylinder passage 38. During operation, when the spool piston 22 moves to the left in FIG. 2, the groove 42 communicates with the accumulator 13 via a third cylinder passage 44 formed in the control valve main body 3A. A width of the groove 42 is slightly smaller than a length L between the second cylinder passage 38 and the third cylinder passage 44. Thus, when the spool piston 22 moves from a state in which the central passage 41 at the center of the spool piston 22 communicates with the second cylinder passage 38 into a state in which the central passage 41 communicates with the third cylinder passage 44, a small time lag occurs. As shown in FIG. 2, the second changeover valve 15 communicates with the second hydraulic chamber 26 formed at the step portion of the pilot piston 20.

The central passage 41 communicates with a discharge passage 45 of the discharge absorbing piston 23 in the third cylinder 40. The discharge passage 45 communicates with a boosting chamber 142 formed in a middle portion of the third cylinder 40 via a hole 46. The boosting chamber 142 is connected to a first changeover valve 14 via the third output port 144. The boosting chamber 142 is also directly connected to the hydraulic pressure transmitter 4 on the front wheel side. The boosting chamber 142 is also connected to the hydraulic pressure transmitter 5 via a proportioning valve 12, which is disclosed in Japanese Examined Patent Publication No. 58-57333.

The discharge absorbing piston 23 is biased towards the spool piston 22 by the discharge absorbing spring 43. Therefore, the spool piston 22 and the discharge absorbing piston 23 come into contact with each other in the boosting chamber 142, and a right end surface of the spool piston 22 is positioned against the control valve main body 3A by a biasing force of the discharge absorbing spring 43. A periphery of the discharge absorbing spring 43 communicates with the reservoir 19 and the hydraulic pressure transmitters 4, 5 via a discharge spring passage 146 formed in the control valve main body 3A. The discharge spring passage 146 also communicates with the pump 6 via an auxiliary valve 18.

Therefore, during non-operation, the boosting chamber 142 communicates with the reservoir 19 via the hole 46 of the discharge absorbing piston 23, then via the discharge passage 45 of the discharge absorbing piston 23, then via the central passage 41 of the spool piston 22, then via the groove 42 of the spool piston 22, and then via the second cylinder passage 38. Accordingly, the boosting chamber 142 is shut off from the accumulator 13.

When the brake pedal 1 is pressed, the hydraulic pressure is generated in the tandem master cylinder 2. Accordingly, the hydraulic pressures in the first hydraulic chamber 25 and the third hydraulic chamber 27 increase. However, the hydraulic pressures on both sides of the pilot piston 20 are the same. Therefore, the pilot piston 20 does not move. The diaphragm piston 21 moves to the left in FIG. 2 due to the hydraulic pressure in the third hydraulic chamber 27, and the spool piston 22 also moves to the left. As a result, the groove 42 communicates with the third cylinder passage 44, and the hydraulic fluid flows from the accumulator 13 into the boosting chamber 142 via the central passage 41. Further, the hydraulic fluid flows into the hydraulic pressure transmitters 4, 5. The spool piston 22 moves to the right and left so that the hydraulic pressure in the boosting chamber 142, acting on the left end of spool piston 22, can be balanced with the hydraulic pressure of the tandem master cylinder 2, acting on the right end of the diaphragm piston 21. The hydraulic pressure in the boosting chamber 142 accordingly increases (amplifies) in proportion to the hydraulic pressure in the tandem master cylinder 2. The amplification ratio is determined by a ratio of the area at the left end of the spool piston 22 to the area at the right end of the diaphragm piston 21.

In order to operate the brake during automatic braking if slippage of wheels occurs when the automobile is stationary, or when a sensor detects an imminent collision, or when an automobile turns around a corner, the electronic control unit opens the second changeover valve 15, which is normally closed, in response to signals sent from sensors (not shown) such as a wheel speed sensor and/or a sensor for detecting an interval between automobiles. At the same time, the electronic control unit closes the third changeover valve 16, which is normally open. Thus, the hydraulic fluid in the accumulator 13 flows through the third cylinder passage 44, then via the second changeover valve 14, and then via the second hydraulic chamber 26, so that the pilot piston 20 moves to the left. The diaphragm piston 21 also moves, so that the spool piston 22 moves to the left. Accordingly, the accumulator 13 and the boosting chamber 142 communicate with each other. Consequently, the hydraulic pressure transmitters 4, 5 are operated and the brake can be used in the same manner as described before.

The hydraulic pressure of the tandem master cylinder 2 acts simultaneously on both end surfaces of the pilot piston 20. However, even if the first hydraulic chamber 25 or third hydraulic chamber 27 is removed from the structure, automatic braking can still be done.

When the brake pedal 1 is operated, the spool piston 22 moves due to a force exerted by the diaphragm piston 21. Immediately after the hydraulic fluid flows from the accumulator 13 into the boosting chamber 142, the discharge absorbing piston 23 compresses the discharge absorbing spring 43 and moves to the left. Therefore, a certain volume of the hydraulic fluid can be absorbed by boosting chamber 142. Thus, at the beginning of operation of the spool piston 22, the hydraulic pressure in the boosting chamber 142 is very low, and it is possible to start a boosting operation from a state in which the hydraulic pressure is very low.

The hydraulic pressure transmitter 4 on the front wheel side is identical to the hydraulic pressure transmitter 5 on the rear wheel side in terms of its structure and function. Accordingly, only the hydraulic pressure transmitter 5 will be described in detail with reference to FIG. 3.

Figure 3:
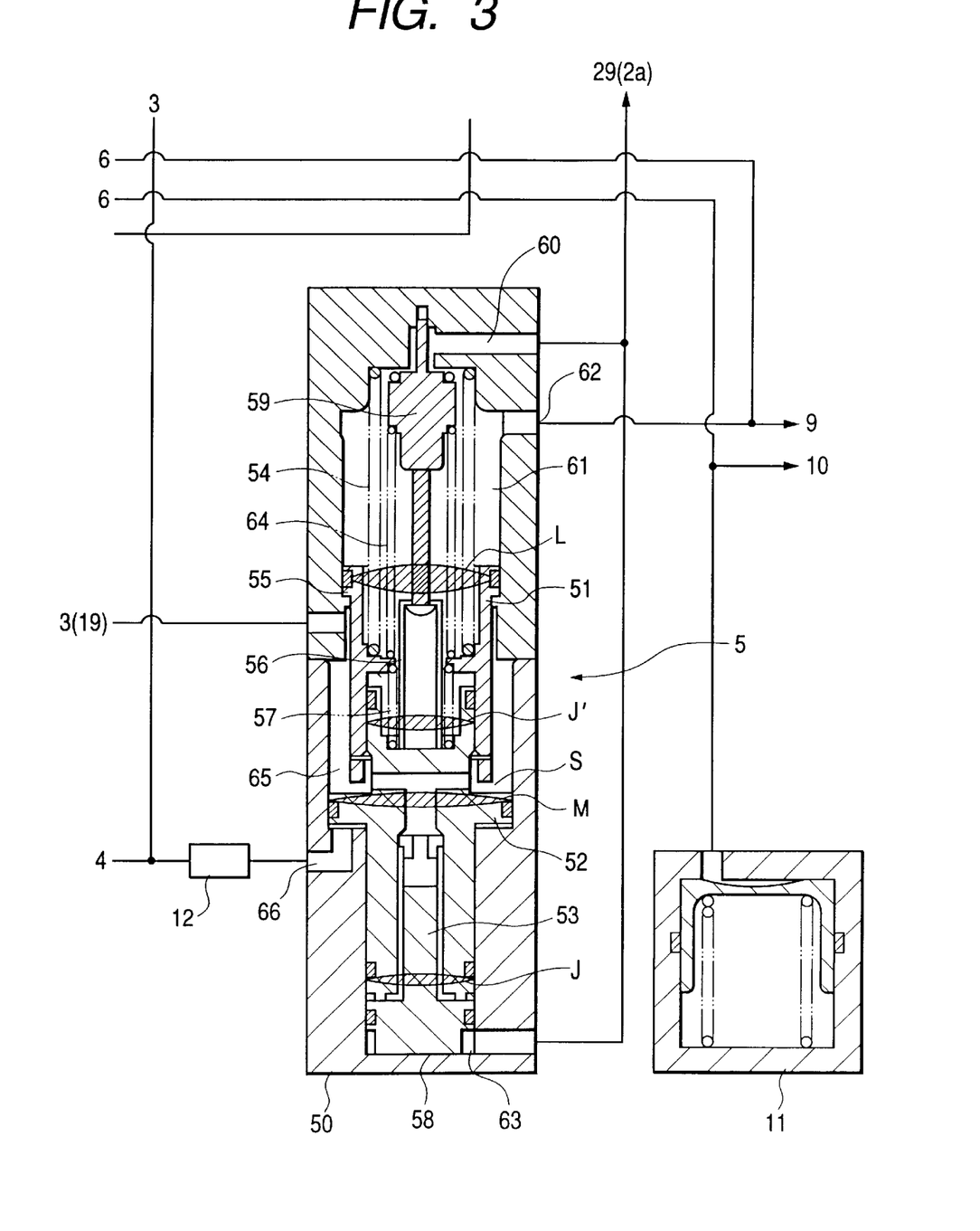
FIG. 3 is an enlarged cross-sectional view of a hydraulic pressure transmitter of the present invention.

As shown in FIG. 3, the hydraulic pressure transmitter 5 includes a first piston 51, a second piston 52, and a third piston 53, which are slidably arranged in a transmitter main body 50 in that order. (As mentioned above, the hydraulic pressure transmitter 4 has an identical first piston 51, second piston 52, third piston 53, etc., a description of which is omitted.) A pressure receiving area of a first piston 51 is L, a pressure receiving area of the small diameter portion of the second piston 52 on the first piston 51 side is J', a pressure receiving area of a large diameter portion of the second piston 52 is M, and a pressure receiving area of the second piston 52 on the third piston 53 side is J. The pressure receiving areas J', J of the second piston 52, and the pressure receiving areas M, L, J satisfy the following expressions:

$$J'=J; M>L>J$$

The small diameter portion of the second piston 52 is slidably engaged with a lower center of the first piston 51, and the first piston 51 is biased downward in FIG. 3 by a first spring 54 in the transmitter main body 50 so that the first piston 51 can come into contact with a stopper 55 in the transmitter main body 50. A second spring 57 is positioned between the first piston 51 and the second piston 52 via a cylindrical spring seat 56, and the second piston 52 is biased downward by a biasing force of the second spring 57. A clearance S is formed between the first piston 51 and the second piston 52. When communication between a first transmitter passage 60 and a pressure chamber 61 is cut off by a cut-off valve 59 during braking, the clearance S is reduced to zero.

The pressure chamber 61, sectioned by the first piston 51, is connected to the wheel cylinders 8 via a transmitter output port 62 formed in the main body 50 and via the holding valves 9. Further, the pressure chamber 61 is connected to the first transmitter passage 60 via the cut-off valve 59. The first transmitter passage 60 communicates with the first hydraulic pressure chamber 2a via the first output port 29 of the control valve 3. At the same time, the first transmitter passage 60 communicates with an input hydraulic chamber 63 sectioned by the third piston 53. The cut-off valve 59 is biased upward by a third spring 64 in the pressure chamber 61. A lower end portion of an axis of the cut-off valve 59 is slidably engaged with the cylindrical spring seat 56 on the second piston 52 side, and the first transmitter passage 60 communicates with the pressure chamber 61 when the brake is not operated. In the transmitter main body 50, a hydraulic chamber 65 is sectioned between the first piston 51 and the second piston 52. The hydraulic chamber 65 communicates with the reservoir 19 via the control valve 3.

A pressure introducing chamber 66, which is sectioned by the large diameter portion of the second piston 52 in the transmitter main body 50, communicates with the boosting chamber 142 via the proportioning valve 12, as shown in FIGS. 1 and 3. The pressure introducing chamber 66 of the hydraulic pressure transmitter 4 on the front wheel side communicates directly with the boosting chamber 142.

The third piston 53 is slidably engaged with the center of the second piston 52. In a state shown in FIG. 3, the third piston 53 is biased downward by a biasing force of the second spring 57 via the second piston 52. Therefore, an end surface of the third piston 53 comes into contact with a cylinder end surface 58 formed in the transmitter main body 50. The input hydraulic chamber 63 is sectioned between the cylinder end surface 58 and the end surface of the third piston 53. The input hydraulic chamber 63 communicates with the first hydraulic pressure chamber 2a and the first transmitter passage 60 via the first output port 29 of the control valve 3.

When the brake is not operated, the cut-off valve 59 maintains the state shown in FIG. 3, and the first transmitter passage 60 is open.

When the brake pedal 1 is pressed by the driver and the diaphragm piston 21 is moved by the hydraulic pressure of the third hydraulic chamber 27, generated due to the hydraulic pressure in the tandem master cylinder 2, the first transmitter passage 60 is changed over. Then, the hydraulic fluid in the accumulator 13 flows into the pressure introducing chamber 66 via the third cylinder passage 44, then via the central passage 41 of the spool piston 22, then via the boosting chamber 142, then via the third output port 144, and then via the proportioning valve 12. Therefore, the second piston 52 moves upward in the clearance S. When the second piston 52 moves upward in the clearance S, the cut-off valve 59 closes the first transmitter passage 60, and the second piston 52 comes into contact with the first piston 51 so that the first piston 51 moves upward.

On the other hand, the third piston 53 moves upward in FIG. 3 to come into contact with the second piston 52 when the hydraulic pressure of the first hydraulic pressure chamber 2a is transmitted into the input hydraulic chamber 63. As a result, the hydraulic pressure, which is obtained when the hydraulic pressure of the tandem master cylinder 2 is increased by the control valve 3, acts on the first piston 51. Therefore, the hydraulic fluid in the pressure chamber 61 is fed to the wheel cylinders 8 via the holding valves 9, so that the brake can be operated. Similarly, the hydraulic fluid in the pressure chamber 61 of the hydraulic pressure transmitter 4 is fed to the wheel cylinders 7. When the amplification ratio of the control valve 3 is increased and the pressure receiving area L of the first piston 51 is large, it is possible to feed a large quantity of hydraulic fluid to the wheel cylinders 7, 8 with a higher pressure than that of the hydraulic fluid in the tandem master cylinder 2.

The pressure receiving areas J and J', between which the large diameter portion of the second piston 52 is interposed, are the same. Therefore, until the cut-off valve 59 closes the first transmitter passage 60 in the beginning of the braking operation, there is no change in the flow rate in the brake piping. Accordingly, the driver does not feel an incongruity when he presses the brake pedal 1.

In the beginning of the braking operation, the hydraulic pressure generated in the tandem master cylinder 2 is also transmitted to the first transmitter passage 60 of the hydraulic pressure transmitter 5 via the first output port 29 of the control valve 3. However, since the cut-off valve 59 in each hydraulic pressure transmitter 5 is closed, as described above, communication between the tandem master cylinder 2 and the wheel cylinders 8 is shut off.

The hydraulic pressure transmitter 5 is capable of functioning during braking even in the case of a brake failure, when, for example, the hydraulic fluid cannot be fed from the accumulator 13 and boosting cannot be performed. Since the second piston 52 and the third piston 53 do not move, the hydraulic fluid pressurized by the tandem master cylinder 2 is directly transmitted to the wheel cylinders 8 via the first output port 29 of the control valve 3, then via the first transmitter passage 60 in the transmitter main body 50 of the hydraulic pressure transmitter 5, then via the open cut-off valve 59, and then via the transmitter output port 62 to the wheel cylinders 8. Thus, braking can be accomplished. Also, a diameter of the hydraulic pressure piston (not shown) of the tandem master cylinder 2 is relatively small so that the amplification ratio is high, as described above. Therefore, in the case of a brake failure, the hydraulic pressure generated by the hydraulic pressure piston in the tandem master cylinder 2 can be increased. Accordingly, it is still possible to ensure a sufficiently high braking force.

During the automatic braking operation of the hydraulic pressure transmitters 4, 5, such as traction control or yawing moment control, the hydraulic pressure is introduced from the accumulator 13 into the pressure introducing chamber 66 via the proportioning valve 12. The second piston 52 and the first piston 51 are moved upward by the hydraulic fluid, and the brake can be operated.

If the second piston 52 and the third piston 53 were to be integrally formed, a volume of the input hydraulic chamber 63 is increased during the automatic braking operation, and hydraulic pressure in the input hydraulic chamber 63 and the piping system connected with it temporarily becomes negative. Accordingly, air might flow into the input hydraulic chamber 63. However, in the present invention, the second piston 52 and the third piston 53 are formed separately, so that they can move relative to each other. During the automatic braking operation, since the hydraulic pressure of the tandem master cylinder 2 is not transmitted into the input hydraulic chamber 63, the third piston 53 does not move upward. Accordingly, the negative pressure cannot be generated in the input hydraulic chamber 63.

Figure 4:
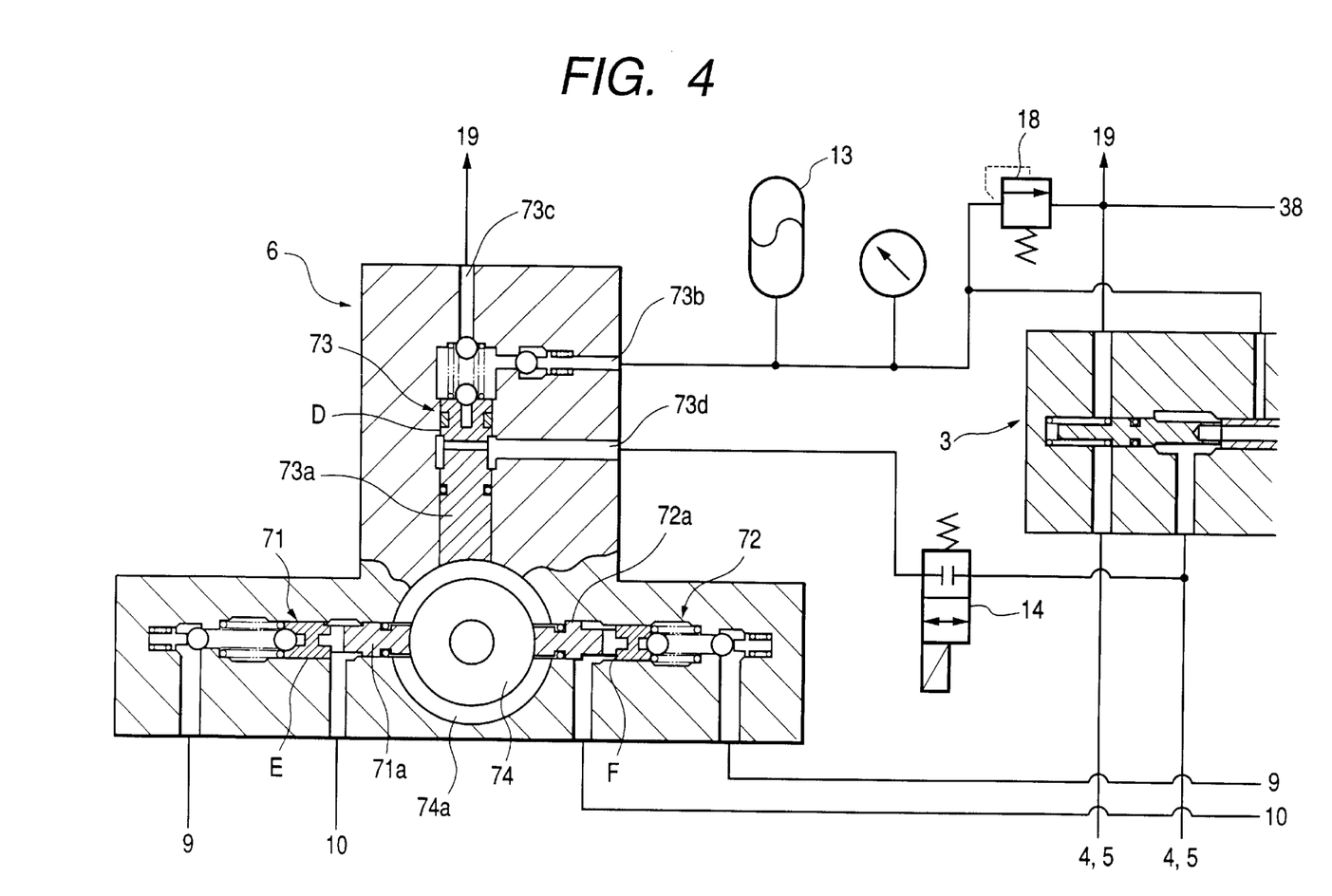
FIG. 4 is an enlarged cross-sectional view of a hydraulic pump of the present invention.

As shown in FIG. 4, the pump 6 includes two anti-lock control pumps 71, 72 used for anti-lock control, and the booster pump 73 for pumping out the hydraulic fluid from the hydraulic pressure transmitters 4, 5. Plungers 71a, 72a of the hydraulic pumps 71, 72 used for controlling the anti-lock operation are symmetrical with respect to a common cam 74, and the plungers 71a, 72a come into contact with the common cam 74. A plunger 73a of the booster pump 73 moves from the plungers 71a, 72a in an axial direction. That is, the plunger 73a moves from the plungers 71a, 72a in a direction perpendicular to the plane of FIG. 4. The plunger 73a comes into contact with a cam 74a, which is different from the common cam 74 used for anti-lock control. When the cams 74, 74a are turned by a motor (not shown), the plungers 71a, 72a, 73a are reciprocated by the cams 74, 74a, so that ball valves are opened and closed to allow pumping. A discharge port 73b of the booster pump 73 communicates with the accumulator 13, a first suction port 73c communicates with the reservoir 19, and a second suction port 73d communicates with the first changeover valve 14. Since such pump structures are well known in the art, a more detailed explanation is omitted.

In the pump 6, the following inequality can be established between pressure receiving area D of the plunger 73a and pressure receiving areas E, E' of the plungers 71a, 72a respectively:

$$D \geq E + E'$$

The reason why the pressure receiving areas D, E, E' satisfy the inequality is as follows. When the hydraulic fluid is pumped out by the booster pump 73 from the pressure introducing chambers 66 of the hydraulic pressure transmitters 4, 5 during the anti-lock operation, it is necessary to ensure a sufficiently large pump capacity so that the hydraulic fluid cannot leak from the boosting chamber 142 into the reservoir 19. That is, when the amount of discharge from the anti-lock control pumps 71, 72 is larger than the amount pumped by the booster pump 73, the hydraulic fluid on the boosting chamber 142 side pushes back the spool piston 22 and flows into the reservoir 19. In order to prevent such an occurrence, the above inequality must be established.

A structure of control valves including the holding valves 9 and the decay valves 10 is the same as in a conventional circulating flow type anti-lock control device. The holding valves 9 and the decay valves 10 are opened and closed by a command from the electronic control unit (not shown). The holding valves 9 and the decay valves 10 are opened and closed to adjust the pressure of the hydraulic fluid not only for anti-lock control operation, but also during automatic braking for traction control and yawing moment control, which will be discussed below.

Operation of the brake fluid pressure controller of the present invention will be explained below.

When the driver does not press the brake pedal 1 and no hydraulic pressure is generated in the tandem master cylinder 2, no hydraulic pressure is generated in the first hydraulic chamber 25 or in the third hydraulic chamber 27. Accordingly, the control valve 3 is not operated and remains in a state shown in FIG. 2. As a result, the hydraulic fluid from the accumulator 13 is shut off by the spool piston 22. Since no hydraulic pressure is generated in the input hydraulic chamber 63 and the pressure introducing chamber 66, no hydraulic pressure is generated in the wheel cylinders 7, 8.

When the driver presses on the brake pedal 1 and the hydraulic pressure is generated in the tandem master cylinder 2, the hydraulic pressure in the second hydraulic pressure chamber 2b is transmitted to the diaphragm 35 via the second input port 30 of the control valve 3 and the third hydraulic chamber 27. At the same time, the hydraulic pressure in the second hydraulic pressure chamber 2b is transmitted to the input hydraulic chamber 63 of the hydraulic pressure transmitter 4 via the second output port 31. On the other hand, the hydraulic pressure in the first hydraulic pressure chamber 2a is transmitted to the first hydraulic chamber 25 and to the input hydraulic chamber 63. At this time, the hydraulic pressures in the first hydraulic chamber 25 and the third hydraulic chamber 27 increase, however, the hydraulic pressures at both end portions of the pilot piston 20 remain the same. Therefore, the pilot piston 20 does not move.

When the hydraulic pressure acts on the diaphragm piston 21, the diaphragm piston 21 moves to the left in FIG. 2, and the spool piston 22 also moves to the left. The spool piston 22 therefore advances into the boosting chamber 142, so that the hydraulic pressure in the boosting chamber 142 increases due to the stroke of the spool piston 22. However, the discharge absorbing piston 23 bends the discharge absorbing spring 43 and moves to the left, so that a certain amount of the hydraulic fluid corresponding to the stroke of the spool piston 22 can be absorbed by the boosting chamber 142. Therefore, when the spool piston 22 begins to move, the hydraulic pressure in the boosting chamber 142 is very low. Accordingly, it is possible to start the boosting action at a low hydraulic pressure.

Further, the third hydraulic chamber 27 and the reservoir 19 are separated from each other by the diaphragm 35. Accordingly, compared to an arrangement where a sealing member is arranged in a periphery of a piston, it is possible to reduce the sliding resistance of the diaphragm 35. Therefore, it is possible to reduce the amount of effort needed by the driver when pressing the brake pedal 1.

As the spool piston 22 moves further to the left, the central passage 41 in the spool piston 22 communicates with the third cylinder passage 44 in the control valve main body 3A, and the boosting chamber 142 communicates with the accumulator 13, so that the hydraulic fluid is introduced into the pressure introducing chambers 66 of the hydraulic pressure transmitters 4, 5. The hydraulic fluid is introduced into the hydraulic pressure transmitter 5 via the proportioning valve 12. Then, the second piston 52 in the hydraulic pressure transmitter 5 moves upward in clearance S. Due to the upward movement of the second piston 52, the cut-off valve 59 first closes the first transmitter passage 60. After that, the second piston 52 comes into contact with the first piston 51. The first piston 51 moves upward in FIG. 3, and the hydraulic pressure in the pressure chamber 61 increases. Therefore, the hydraulic fluid in the pressure chambers 61 is fed into the wheel cylinders 7, 8 via the holding valves 9, so that the brakes can be operated. The hydraulic pressure in the boosting chamber 142 is proportional to the hydraulic pressure in the tandem master cylinder 2 that acts on the diaphragm piston 21.

The hydraulic pressure from the tandem master cylinder 2 is transmitted to the hydraulic pressure transmitters 4, 5 from the first output port 29 and the second output port 31, respectfully, and acts on the input hydraulic chambers 63 of the hydraulic pressure transmitters 4, 5. The hydraulic pressure raises the third piston 53 together with the second piston 52. The hydraulic fluid in the fluid chambers 65 is discharged into the reservoir 19 via the control valve 3.

When the brake pedal 1 is released, the spool piston 22 returns to its initial position. Therefore, the hydraulic fluid in the pressure introducing chamber 66 is circulated into the reservoir 19 via the boosting chamber 142, then via the central passage 41, and then via the second cylinder passage 38, so that the brake can be released.

As described above, when the hydraulic pressure is applied to the wheel cylinders 7, 8, the third piston 53 moves upward due to the hydraulic pressure of the tandem master cylinder 2, and volume in the input hydraulic chamber 63 increases. Therefore, the hydraulic fluid discharged from the tandem master cylinder 2 can be absorbed. As the force applied to the brake pedal 1 increases, a stroke of the brake pedal 1 also increases. Therefore, it is possible for a driver to have a good sense of the operation of the brake pedal.

When the wheels are locked during braking, the anti-lock control is carried out as follows. After a signal is sent from a wheel speed sensor (not shown), a command is sent out from the electronic control unit. As is well known in the conventional art, the holding valves 9, the decay valves 10 and the pump 6 are opened and driven by this command, so that a locking of the wheels can be prevented. At the same time, the first changeover valve 14 is opened, and the second suction port 73d of the booster pump 73 communicates with the boosting chamber 142 and the pressure introducing chamber 66.

When the wheels are locked, the holding valves 9 are closed as long as the decay valves 10 are closed, so that the hydraulic pressure in the wheel cylinders 7, 8 can remain the same. After that, the decay valves 10 are opened, so that the hydraulic fluid in the wheel cylinders 7, 8 can be absorbed by the anti-lock reservoir 11, and the hydraulic pressure in the cylinders 7, 8 can be reduced. The hydraulic fluid, which has flowed into the anti-lock reservoir 11 used for anti-lock control in the event of a drop in the hydraulic pressure, is pumped out by the anti-lock control pumps 71, 72 and returned to the pressure chamber 61 of the hydraulic pressure transmitter 5. Therefore, the first piston 51, the second piston 52 and the third piston 53 are retracted, and the hydraulic fluid in the pressure introducing chamber 66 is pumped out by the booster pump 73 and circulated into the accumulator 13. When a volume of the input hydraulic chamber 63 is reduced by the retraction of the third piston 53, a kickback is caused in the tandem master cylinder 2. Therefore, the driver can sense the start of the anti-lock control operation.

When it becomes necessary to increase hydraulic pressure during the anti-lock control operation, the decay valves 10 are closed and the holding valves 9 are opened, so that the first piston 51, the second piston 52 and the third piston 53 are raised by the hydraulic pressure in the pressure introducing chamber 66 and the input hydraulic chamber 63. Accordingly, the hydraulic pressure is applied to the hydraulic pressure chambers 61, and pressure in the wheel cylinders 7, 8 can be increased again. The booster pump 73, which is driven simultaneously with the start of anti-lock control operation, pumps the hydraulic fluid from the pressure introducing chambers 66 of the hydraulic pressure transmitters 4, 5 and via the first changeover valve 14 shown in FIG. 1, which is kept open during the anti-lock control operation. The hydraulic fluid that is pumped out is thus circulated into the accumulator 13. Since the hydraulic pressure in the pressure introducing chamber 66 is proportional to the hydraulic pressure in the tandem master cylinder 2 at this time (in other words, since the hydraulic pressure in the pressure introducing chamber 66 is proportional to the hydraulic pressure in the tandem master cylinder 2 acting on the diaphragm piston 21) the booster pump 73 pumps out the hydraulic fluid whose pressure is increased to a predetermined value. Therefore, compared to a structure where the hydraulic fluid is pumped out from a reservoir, a load necessary for pumping can be reduced.

As described above, during the kickback caused on the tandem master cylinder 2 side during the hydraulic anti-lock control operation, the hydraulic pressure is applied to the wheel cylinders 7, 8 while the hydraulic pressure in the accumulator 13 falls. On the other hand, the booster pump 73 pumps out the hydraulic fluid from the hydraulic pressure transmitters 4, 5, so that the hydraulic pressure can be accumulated in the accumulator 13. Thus, a load applied to the booster pump 73 can be reduced.

In order to operate the brake during automatic braking if slippage of the wheels occurs when the automobile is stationary, or when a sensor detects an imminent collision, or when the automobile turns around a corner, the electronic control unit applies an appropriate intensity of the braking force to each wheel, and the slippage can be avoided.

When the slippage occurs, the brake fluid pressure controller operates as follows. The electronic control unit opens the second changeover valve 15, which is normally closed, according to signals sent from sensors (not shown) such as a wheel speed sensor and a sensor for collision detection. At the same time, the electronic control unit closes the third changeover valve 16, which is normally open.

As a result, the hydraulic fluid in the accumulator 13 is introduced into the second hydraulic chamber 26 via the second changeover valve 15, so that the pilot piston 20 moves to the left FIG. 2. The diaphragm piston 21 also moves in accordance with the movement of the pilot piston 20. Accordingly, the spool piston 22 moves to the left, and the accumulator 13 and the boosting chamber 142 communicate with each other. Consequently, the hydraulic pressure transmitters 4, 5 are operated and the brake can be applied in the same manner as that of the braking operation described above. When the second changeover valve 15 is closed, the hydraulic pressure in the wheel cylinders 8 can stay constant. When the third changeover valve 16 is opened, the second hydraulic chamber 26 communicates with the reservoir 19, and its hydraulic pressure is reduced, so that the hydraulic pressure in the wheel cylinders 7, 8 is also reduced.

In the hydraulic pressure transmitter 5 of the present invention, the second piston 52 is separate from the third piston 53, and only the second piston 52 is independently moved in the process of the automatic braking. Therefore, it is unnecessary to move the third piston 53 during the automatic braking. As a result, negative pressure is not generated in the input hydraulic chamber 63.

The hydraulic pressure transmitter 5 is capable of the braking operation even in the event of a failure when the hydraulic fluid cannot be fed from the accumulator 13 for some reason, and the hydraulic pressure transmitting function cannot be exhibited. The hydraulic fluid pressurized by the tandem master cylinder 2 is directly transmitted to the wheel cylinders 7, 8 via the first output port 29 and the second output port 30 of the control valve 3, then via the open cut-off valve 59 of the hydraulic pressure transmitters 4, 5, then via the pressure chamber 61, and then via the transmitter output port 62 to the wheel cylinders 7, 8. Thus, braking can be accomplished.

A diameter of the hydraulic pressure piston of the tandem master cylinder 2 is relatively small so that a sufficiently high braking force can be ensured even in the event of a failure.

When a failure has occurred in the hydraulic system of the first hydraulic pressure chamber 2a, the hydraulic pressure can be generated in the wheel cylinders 7, 8 due to the hydraulic pressure in the second hydraulic pressure chamber 2b, which is transmitted into the third hydraulic chamber 27, in the same manner as during a normal braking operation. On the other hand, when a failure has occurred in the hydraulic system of the second hydraulic pressure chamber 2b, the pilot piston 20 is moved by the hydraulic pressure of the first hydraulic chamber 2a and comes into contact with the diaphragm piston 20. When the diaphragm piston 20 moves to the left, the hydraulic pressure is generated in the wheel cylinders 7, 8 in the same manner as during the normal braking.

The sealing structure of the pistons 20, 21, 22, 23 in the control valve 3 described in the preferred embodiment of the present invention can be applied not only to the control valve 3 of the brake but to any piston that conducts the same action. The following advantages result from the present invention.

When a profile of the pistons 20, 21, 22, 23 arranged in the control valve 3 is changed, it is possible to realize automatic braking. Therefore, the brake can be downsized and cost can be reduced.

When slippage of the wheels occurs when the automobile is stationary, or when the brakes are automatically operated because an interval between automobiles is excessively reduced, or when control of yawing moment is carried out to ensure stability of an automobile body when turning around a corner, the automatic braking operation is conducted, and it is possible to apply an appropriate braking force to the wheels.

The pumps and various control valves can be controlled by the electronic control unit according to information obtained by various sensors. Accordingly, by changing the software in the electronic control unit, various types of braking operations can be realized.

During the anti-lock control or traction control, it is possible to accurately increase, decrease, or hold steady the pressure of the hydraulic fluid. Therefore, the driver can have a good sense of the brake.

Since the diaphragm 35 is used as a sealing member of the diaphragm piston 21, there is no sliding resistance, unlike with the conventional sliding type sealing member, and there is no hydraulic pressure loss. Further, hysteresis can be decreased when a pressurizing state is shifted to a depressurizing state. For example, when the diaphragm 35 is used for the hydraulic piston, it is possible to improve the response characteristics of the brake. When the wall thickness of the flexible portion 35b of the diaphragm 35 is changed, it is possible to change the amplification ratio.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A brake fluid pressure controller comprising:

a tandem master cylinder;

a control valve having a control valve main body and connected to the tandem master cylinder via a first input port;

a diaphragm piston inside the control valve main body;

a diaphragm inside the control valve main body, wherein an outer circumference of the diaphragm is secured to the control valve main body; and a first output port for outputting hydraulic pressure proportional to pressure in the tandem master cylinder, wherein a flexible portion of the diaphragm is adapted to contact an end surface of the diaphragm piston;

wherein a wall thickness of the diaphragm decreases from a center portion of the diaphragm to the outer circumference of the diaphragm;

a first cylinder in the control valve main body;

a pilot piston slidably arranged within the first cylinder and having a stepped shape including a large diameter portion and a small diameter portion;

a first hydraulic chamber, a second hydraulic chamber and a third hydraulic chamber arranged within the first cylinder and sectioned by the pilot piston;

a second output port in the control valve main body; and a third output port in the control valve main body, wherein the first hydraulic chamber communicates with a first hydraulic pressure chamber of the tandem master cylinder via the first input port, wherein the first hydraulic chamber communicates with the first output port of the control valve, wherein the second hydraulic chamber communicates with the third output port, wherein the third hydraulic chamber communicates with the second input port of the control valve main body, and wherein the third hydraulic chamber communicates with the second output port.

2. The brake fluid pressure controller of claim 1, wherein the pilot piston is biased away from the diaphragm piston by a spring.

3. The brake fluid pressure controller of claim 1, wherein the diaphragm piston includes a large diameter portion and a small diameter portion, and wherein a groove is formed in the small diameter portion.

4. The brake fluid pressure controller of claim 1, further including a spool piston abutting the diaphragm piston and having a groove formed on its outer circumference.

5. The brake fluid pressure controller of claim 1, wherein the control valve further includes a spool piston slidably arranged in the control valve main body, wherein one end of the spool piston contacts an end of the diaphragm piston opposite the diaphragm.

6. The brake fluid pressure controller of claim 1, wherein the first input port of the control valve is connected to a first hydraulic pressure chamber of the tandem master cylinder.

7. A brake fluid pressure controller comprising:

a tandem master cylinder;

a control valve having a control valve main body and connected to the tandem master cylinder via a first input port;

a diaphragm piston inside the control valve main body;

a diaphragm inside the control valve main body, wherein an outer circumference of the diaphragm is secured to the control valve main body;

a first output port for outputting hydraulic pressure proportional to pressure in the tandem master cylinder, wherein a flexible portion of the diaphragm is adapted to contact an end surface of the diaphragm piston, and wherein a wall thickness of the diaphragm decreases from a center portion of the diaphragm to the outer circumference of the diaphragm;

a first cylinder in the control valve main body;

a pilot piston slidably arranged within the first cylinder and having a stepped shape including a large diameter portion and a small diameter portion;

a first hydraulic chamber, a second hydraulic chamber and a third hydraulic chamber arranged within the first cylinder and sectioned by the pilot piston;

a second output port in the control valve main body;

a third output port in the control valve main body, wherein the first hydraulic chamber communicates with the a first hydraulic pressure chamber of the tandem master cylinder via the first input port, wherein the first hydraulic chamber communicates with the first output port of the control valve, wherein the second hydraulic chamber communicates with the third output port, wherein the third hydraulic chamber communicates the second input port of the control valve main body, and wherein the third hydraulic chamber communicates with the second output port a second cylinder arranged in the control valve main body; and a second cylinder passage formed in the control valve main body, wherein the diaphragm piston is slidably arranged within the second cylinder and further includes:

a large diameter portion and a small diameter portion;

a first groove formed in a periphery of the small diameter portion; and a hydraulic chamber formed on a small diameter end surface side of the diaphragm piston, wherein the hydraulic chamber is sectioned by the first groove and the diaphragm piston and communicates with the second cylinder passage.

8. The brake fluid pressure controller of claim 7, further including:

a third cylinder in the control valve main body;

a spool piston slidably arranged in the third cylinder;

a central passage formed in a center of the spool piston;

a second groove formed on an outer circumference of the spool piston and communicating with the central passage; and a third cylinder passage formed in the control valve main body and connected to the third cylinder, wherein the second groove communicates with the third cylinder passage during a braking operation, and wherein the second groove communicates with the second cylinder passage during non-operation.

9. The brake fluid pressure controller of claim 8, further including:

a discharge absorbing piston slidably arranged in the third cylinder;

a discharge absorbing spring arranged at one end of the third cylinder, biasing the discharge absorbing piston towards the spool piston;

a boosting chamber formed in a middle portion of the third cylinder and communicating with a third output port formed in the control valve main body;

a discharge passage formed in the discharge absorbing piston and communicating with the boosting chamber and the central passage; and a discharge spring passage formed in the control valve main body and communicating with the discharge absorbing spring end of the third cylinder.

10. The brake fluid pressure controller of claim 9, further including:

a first hydraulic pressure transmitter connected to the first and third output ports;

a second hydraulic pressure transmitter connected to the second and third output ports;

a second hydraulic pressure chamber of the tandem master cylinder connected to the control valve via the second input port;

a pump connected to the third output port via a first changeover valve, connected to the second cylinder passage via an auxiliary valve, and connected to a third input port of the control valve main body via a second changeover valve, wherein the third input port is connected to the second cylinder passage via a third changeover valve;

a reservoir connected to a pump and to the discharge spring passage;

an accumulator connected to the pump;

an anti-lock reservoir connected to the pump; and a wheel cylinder connected to the first hydraulic pressure transmitter via a holding valve and a decay valve.

11. The brake fluid pressure controller of claim 10, wherein the first hydraulic pressure transmitter further includes:

a transmitter main body;

a first piston slidably arranged in the transmitter main body;

a second piston slidably arranged in the transmitter main body;

a third piston slidably arranged in the transmitter main body and slidably engaged with the second piston;

a pressure chamber formed in the transmitter main body, sectioned by the first piston, and connected to the first output port via a first transmitter passage;

a cut-off valve for cutting off communication between the pressure chamber and the first transmitter passage;

an output port connecting the pressure chamber and the holding valve;

an input hydraulic chamber connected to the first transmitter passage;

a hydraulic chamber communicating with the reservoir; and a pressure introducing chamber sectioned by the second piston and communicating with the third output port.

* * * * *